US009576000B2

(12) United States Patent
Balmin et al.

(10) Patent No.: US 9,576,000 B2
(45) Date of Patent: Feb. 21, 2017

(54) ADAPTIVE FRAGMENT ASSIGNMENT FOR PROCESSING FILE DATA IN A DATABASE (71) Applicant: INTERNATIONAL BUSINESS MACHINES CORPORATION, Armonk, NY (US)

(72) Inventors: Andrey Balmin, San Jose, CA (US); Romulo Antonio Pereira Goncalves, San Jose, CA (US); Fatma Ozcan, San Jose, CA (US); Jonas Traub, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 14/261,699

(22) Filed: Apr. 25, 2014

(65) Prior Publication Data
US 2015/0310030 A1 Oct. 29, 2015

(51) Int. Cl.
G06F 17/30 (2006.01)
(52) U.S. Cl.
CPC ... *G06F 17/30283* (2013.01); *G06F 17/30171* (2013.01); *G06F 17/30194* (2013.01); *G06F 17/30386* (2013.01)
(58) Field of Classification Search
CPC .................. G06F 17/30283; G06F 17/30979
See application file for complete search history.

(56) References Cited

U.S. PATENT DOCUMENTS

| 8,417,727 B2 | 4/2013 | Slezak |
| 2008/0133698 A1 | 6/2008 | Chavez |
| 2008/0133706 A1 | 6/2008 | Chavez |
| 2011/0314174 A1 | 12/2011 | Joung |
| 2012/0311581 A1 | 12/2012 | Balmin |

OTHER PUBLICATIONS

Hakimzadeh, Kamal, Hooman Peiro Sajjad, and Jim Dowling. "Scaling HDFS with a strongly consistent relational model for metadata." Distributed Applications and Interoperable Systems. Springer Berlin Heidelberg, 2014.*
Data Locality in Hadoop, accessed Apr. 8, 2016 at http://www.hadoopinrealworld.com/data-locality-in-hadoop/.*
Dwerryhouse, Handling Cassandra concurrency issues, using Apache Zookeeper, Aug. 10, 2012, accessed Apr. 7, 2016 at http://weblog.leapster.org/archives/295-handling-cassandra-concurrency-issues-using-apache-zookeeper.html.*
Stack Overflow, About Hadoop/HDFS file splitting, accessed Apr. 8, 2016 at http://stackoverflow.com/questions/9258134/about-hadoop-hdfs-file-splitting.*

(Continued)

Primary Examiner — William Spieler
(74) Attorney, Agent, or Firm — Erik Huestis; Stephen Kenny; Foley Hoag LLP (57) ABSTRACT Scheduling mechanisms for assigning data in a distributed file system to database workers are provided. In one embodiment, a method of and computer program product for assignment of data blocks to database workers are provided. A request for table data is received. Metadata for a plurality of blocks in a file system is retrieved from a metadata store. Each of the plurality of blocks contains a subset of the table data. A request for work is received from a requestor. An assignment of one or more of the plurality of blocks is provided to the requestor.

16 Claims, 9 Drawing Sheets (56) References Cited

OTHER PUBLICATIONS

Hadoop Fair Scheudler Design Document, Oct. 18, 2010, accessed Sep. 29, 2016 at http://www.valleytalk.org/wp-content/uploads/2013/03/fair_scheduler_design_doc.pdf.*

Lamb et al., "The Objectstore Database System." (1991) Communications of the ACM, vol. 34 (10).

Ames et al., "A Metadata-Rich File System." University of California, Santa Cruz. IBM.

Traub, J. "Integration of JagI into DB2 Data Partitioning Feature for handling file data" IBM Almaden Research Center, San Jose, CA.

* cited by examiner

ADAPTIVE FRAGMENT ASSIGNMENT FOR PROCESSING FILE DATA IN A DATABASE

BACKGROUND

Embodiments of the present invention relate to fragment assignment for processing file data in a database, and more specifically, to scheduling mechanisms for assigning data in a distributed file system to database workers.

BRIEF SUMMARY

According to one embodiment of the present invention, a method of and computer program product for assignment of data blocks to database workers are provided. Metadata of a plurality of blocks of a file system is stored in a metadata store. A process is executed that requires data from at least one of the blocks of the file system. Exclusive access to the at least one of the blocks is acquired. Data from the at least one of the blocks is supplied to the process.

According to another embodiment of the present invention, a method of and computer program product for assignment of data blocks to database workers are provided. A request for table data is received. Metadata for a plurality of blocks in a file system is retrieved from a metadata store. Each of the plurality of blocks contains a subset of the table data. A request for work is received from a requestor. An assignment of one or more of the plurality of blocks is provided to the requestor.

According to another embodiment of the present invention, a system for assignment of data blocks to database workers is provided. The system includes a plurality of data nodes each comprising a plurality of data blocks, a plurality of database workers, a metadata store comprising metadata of the plurality of data blocks, and a scheduler. The scheduler receives requests for table data. The scheduler retrieves metadata for the plurality of blocks from the metadata store. Each of the plurality of blocks contains a subset of the table data. The scheduler receives a request for work from a requestor. The scheduler provides an assignment of one or more of the plurality of blocks to the requestor.

DETAILED DESCRIPTION

According to embodiments of the present disclosure, mechanisms are provided to assign portions of one or more files stored in a distributed file system (DFS) to workers in a parallel database dynamically as the file is processed at run-time. In many enterprises, only a small percentage of enterprise data is stored in a relational database. Instead, most data is stored in a file system. There is a need to process, combine and correlate data in relational databases with the data stored in DFS. Relational databases may provide mechanisms including external table functions and federation techniques to ingest file data to the database. In a parallel database setting, a database optimizer may create a static plan and the file data may be partitioned statically among the database workers. There remains a need in the art for a mechanism to dynamically assign portions of a given file to database workers and hence provide the ability to balance work adaptively.

Distributed File Systems (DFS) include Google File System (GFS), Ceph, Windows Distributed File System, Fraunhofer Parallel File System (FhGFS), GlusterFS, Lustre, Ibrix, and Hadoop distributed file system (HDFS). Although several exemplary embodiments herein are described with respect to HDFS, the systems and methods of the present disclosure may be applied to other distributed file systems according to the present disclosure.

In some embodiments of the present disclosure, adaptive assignment mechanisms are provided that make use of a Distributed MetaData Store (DMDS). In some embodiments, the DMDS is Apache ZooKeeper. The DMDS stores a global status of file partitions. Such file partitions may be referred to as "splits," for example in HDFS. File partitions may also be referred to as blocks, for example in other DFS. Database Workers lock splits in the DMDS in order to acquire exclusive access before processing them. By keeping processing units small, this mechanism allows dynamically balancing the work among the database workers.

Providing a fixed assignment of input files to database partitions using a control file has certain disadvantage in a distributed database. This approach requires generating many files, and a plan for ingestion into the database. However, HDFS stores data independent of a DBMS. Moreover, static assignment may not be possible in systems that organize data outside of the control of the database. Another alternative would be to provide static assignment using HDFS metadata. However, this approach would not balance the load dynamically and account for slower nodes. For example, if a partition is slower than others, then it is not possible to reassign its work to other nodes. This slow node will cause long evaluation times. In addition, the requirement to split large input files manually into smaller files may impose a burden on the user.

Adaptive file parallelism according to embodiments of the present disclosure avoids the limitations of a fixed assignment of input files to database partitions. As set forth further below, input splits are created automatically and a dynamic assignment of these splits is made to the workers at runtime. Situation aware mappers may be implemented in a MapReduce system such as a Hadoop, using Jaql, HDFS and Adaptive MapReduce. In some implementations using Hadoop, User Defined Functions (UDF) may be defined that perform various of the methods set out herein. In some embodiments, one or more UDF are independent from a running Hadoop instance. Wrapper classes may be defined that allow any Hadoop InputFormat$_{java}$ to read data using user-defined parallel table functions. Alternatively, some embodiments may be implemented by a database process rather than a UDF. This process may be integrated into the database platform, or may be included through a library or plugin. Although various exemplary embodiments herein refer to a UDF, these are to be understood as including implementations using a more general database process.

Figure 1:
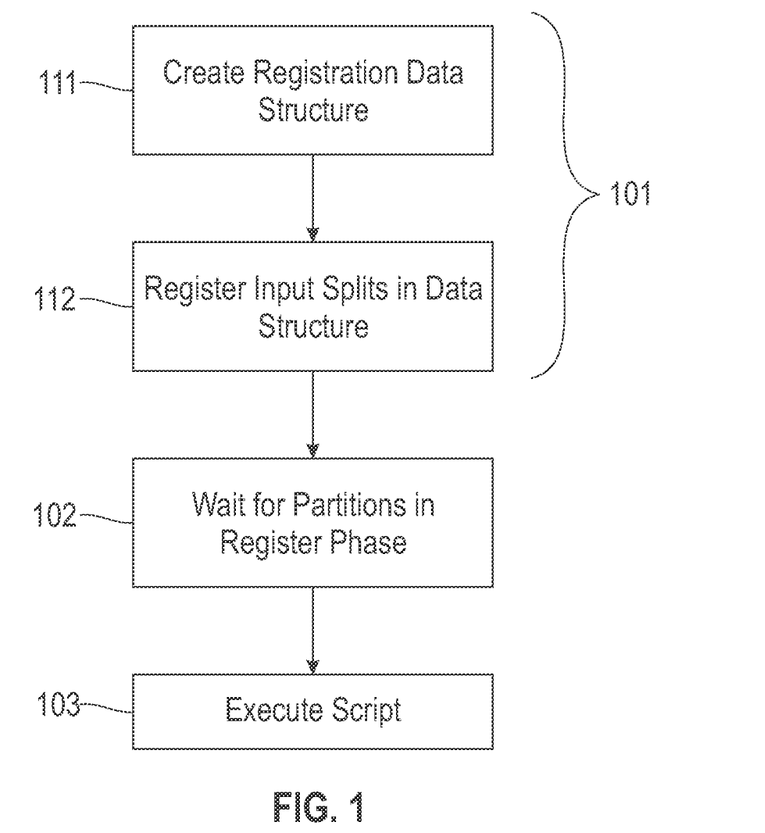
FIG. 1 depicts a method of running an adaptive user defined function according to en embodiment of the present disclosure.

With reference now to FIG. 1, a method of running an adaptive user defined function is provided. In a registration phase 101, a data structure is created 111. Input splits are registered 112 to this structure. In some embodiments, the data structure is created in a DMDS such as Apache ZooKeeper. Creation of the data structure may comprise creation of a new folder or the creation of a status flag without reference to external data. In some embodiments, registration of a split may include saving a description of the split in the DMDS. In some embodiments, pre-existing splits are registered in the registration phase. In other embodiments, splits are generated during the registration phase. In such embodiments, an InputFormat$_{java}$ may be used to get descriptions of input splits for registration. Descriptions may contain the path of an input file, an offset and the number of bytes to read.

In a check phase 102, the database partition waits for other partitions currently in the register phase.

In a read phase 103 a script is executed. The result is parsed and returned to the database as a table. In some embodiments, the script comprises Jaql code. In such embodiments, each read statement included in the Jaql script provided by a user may be referred to as a read task. In other embodiments, alternative tools including but not limited to Impala and Hive are used to execute the script that reads the file data. These tools may exploit map reduce jobs to execute the script, or utilize other mechanisms, such as long running daemons. In some embodiments, these tools run in a special database process and do not require map reduce at all. Although various exemplary embodiments herein refer to Jaql, these are to be understood as including implementations using other Hadoop systems as well.

In some embodiments, Adaptive Map Reduce (MR) is used. In a standard MR application there are some assumptions. One of them is that each Mapper in a Hadoop Map Reduce job runs fully individually and in isolation. Adaptive MR departs from this assumption while integrating a communication protocol that allows each mapper to communicate with others through distributed meta-data storage. Situation-Aware Mappers (SAMs) are able to optimize the execution of the program at run time depending on the global state of the application. In some embodiments, the application status is saved at a ZooKeeper server. The amount of work a mapper does effects the overall performance of an MR job. If a mapper does too little, then the MR job will have too many mappers and resulting overhead. If a mapper does too much, then there are fewer checkpoints and the degree of parallelism goes down. SAMs adjust the amount of work done by a mapper adaptively at run time.

In some embodiments of the present disclosure, the parallelism is driven by the database and not by Hadoop. Instead of having mappers in place, there is a completely separated Jaql instance on each logical database partition that is started by a parallel Java UDF. The Jaql instance on each logical DB partition is started with identical parameters.

Figure 2:
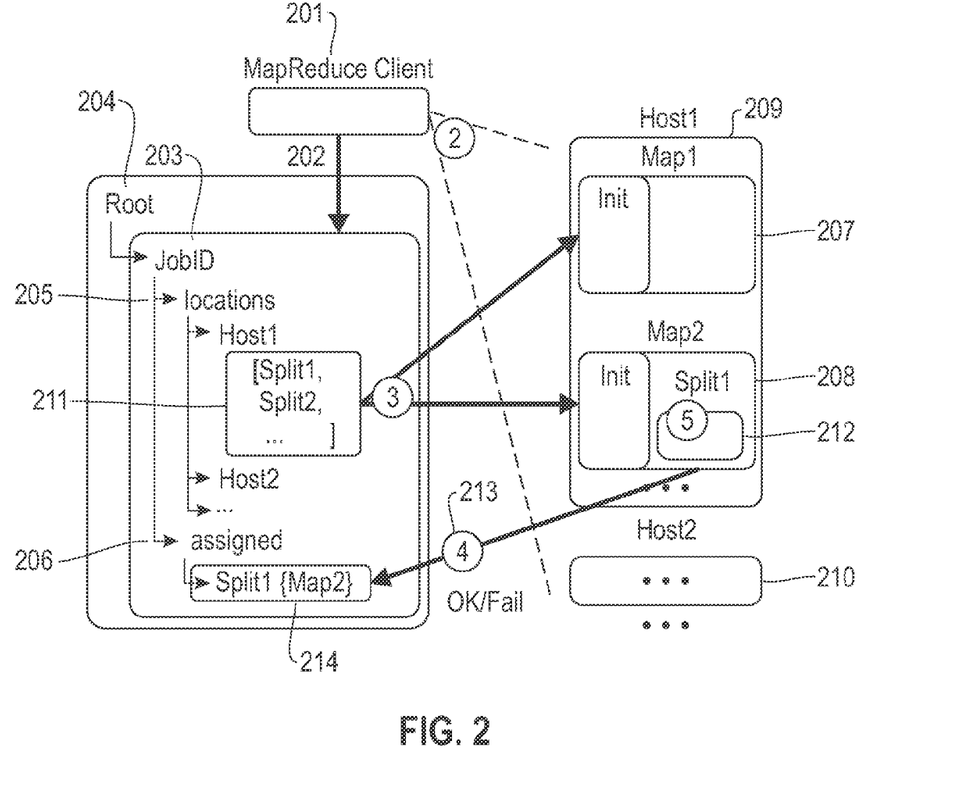
FIG. 2 depicts an exemplary workflow of an Adaptive MapReduce application.

Referring to FIG. 2, an exemplary workflow of an Adaptive MapReduce application is depicted. MapReduce client 201 creates 202 the data structures 203 in a DMDS 204 such as Zookeeper. MapReduce client 201 takes care of the generation of input splits and the physical location of these splits. In exemplary data structure 203, the location folder 205 holds all splits by location while the assignment of the splits will get saved in the assignment folder 206. However, alternative data structures that associate splits with locations may be used in various embodiments of the present disclosure. When splits are saved in DMDS 204 they do not contain the real data but a description of the split. In some embodiments, the description may include the path to the file, an offset, and the number of bytes that belong to the split.

MapReduce client 201 uses virtual splits to start mappers 207, 208. Multiple mappers may be started spread over multiple hosts 209, 210—the arrangement of mappers 207, 208 on host 209 is merely exemplary. In some embodiments, each mapper may connect automatically to the DMDS. For example, in Hadoop, an InputSplit$_{java}$ may connect to the DMDS upon initialization. Each virtual split selects the list of locally available real splits 211 from the DMDS 204. For example, as pictured, Split1 212 is available locally on Host1 209. The adaptive Mapper selects a random Split from the list and tries to lock 213 this split. A Split is locked if a lock flag 214 is set in the assigned folder 206. If the lock was successful the SAM can process the split. The selection and locking processes repeat until all locally available real splits are locked. This allows each adaptive mapper is able to process multiple input splits.

Figure 3:
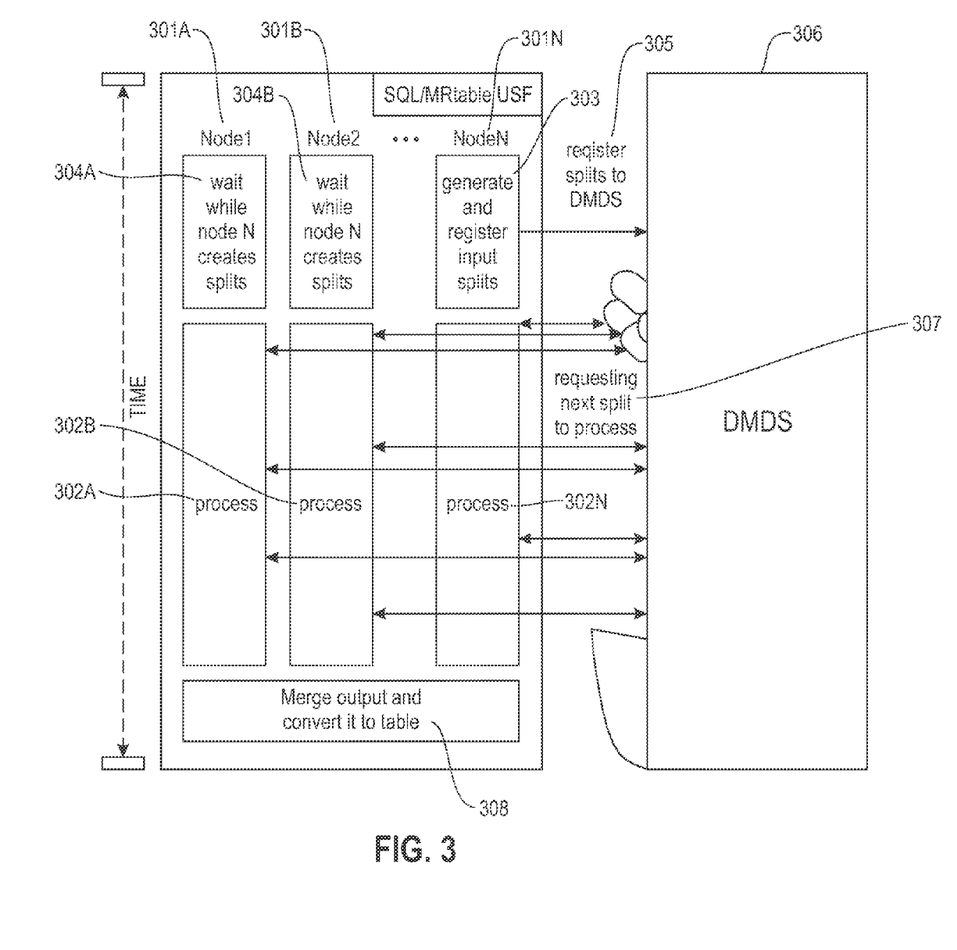
FIG. 3 depicts an exemplary workflow for adaptive file parallelism according to an embodiment of the present disclosure.

Referring to FIG. 3 an exemplary workflow is provided for processing of a UDF using adaptive file parallelism. In this exemplary workflow, nodes 301A . . . N run Jaql processes 302A . . . N. Initially, node 301N generates and registers input splits 303 while the other nodes wait 304A . . . B. The splits are registered 305 to a DMDS 306 such as Zookeeper. As each Jaql process 302A . . . N runs, the next split to process is requested 307 from DMDS 306. After each Jaql process 302A . . . N has completed, the JSON output is merged and converted to a table 308. In embodiments in which alternatives to Jaql are used, the data can be read as text or from a binary format.

In some embodiments, registration phase 101 handles registration of a single task and registration of multiple tasks separately. This separate handling may be provided through two functions optimized to register a single task and to register multiple tasks, respectively.

In the case of a single read task, the registration step cannot run in parallel, because at the beginning of each task some partition has to create the structures that are accessed by all UDF instances during the read phase. So, one of the DB partitions must be first, and gets permission to run the register phase. The other instances will directly proceed with the check phase.

In the case of multiple read tasks, the registration phase can run in parallel. This allows different UDF instances to register the splits for different read tasks. Because of the higher complexity in the register phase, the usage of the function optimized to register multiple tasks creates overhead if it is used to register only one task. However, the benefit outweighs the overhead when creating multiple tasks.

In an exemplary embodiment, the registration function is defined according to Inset 1, below. In this embodiments, the registration function has five parameters: JaqlScript, providing the path to the Jaql script the user wants to run; confJson, configuration parameters required for the reading task providing the input argument of Jaql's read function, which it is also referred to as the input descriptor; frequency, providing time in milliseconds to wait in the check phase before checking the creation status of a task again; timeout, providing the time in milliseconds in the check phase after which the function will abort with an exception if the task(s) is/are not completely created; linesToSkip, providing a specific number of lines in the beginning of Jaql's temporary output file to be skipped without evaluation. In addition to these parameters, a list of predicates to be evaluated and a list of columns to be returned may also be included in various embodiments.

---
Inset 1
---

```
CREATE FUNCTION ZK_TABLE_SE
    ( VARCHAR(255) ,VARCHAR(2000) ,INTEGER, INTEGER,
    INTEGER)
    RETURNS GENERIC TABLE
    EXTERNAL NAME 'sqlmrJaqlJAR:com.ibm.sqlmrJaql.
        ZK_TABLE_SE.ZK_TABLE_RUN'
    LANGUAGE JAVA
    SPECIFIC z k t a b l e s e
    PARAMETER STYLE DB2GENERAL
    DETERMINISTIC
    FENCED THREADSAFE
    NOT NULL CALL
    NO SQL
    NO EXTERNAL ACTION
    NO SCRATCHPAD
    NO FINAL CALL
    ALLOW PARALLEL EXECUTE ON ALL DATABASE
    PARTITIONS
        RESULT TABLE DISTRIBUTED
    DBINFO;
```

Figure 4:
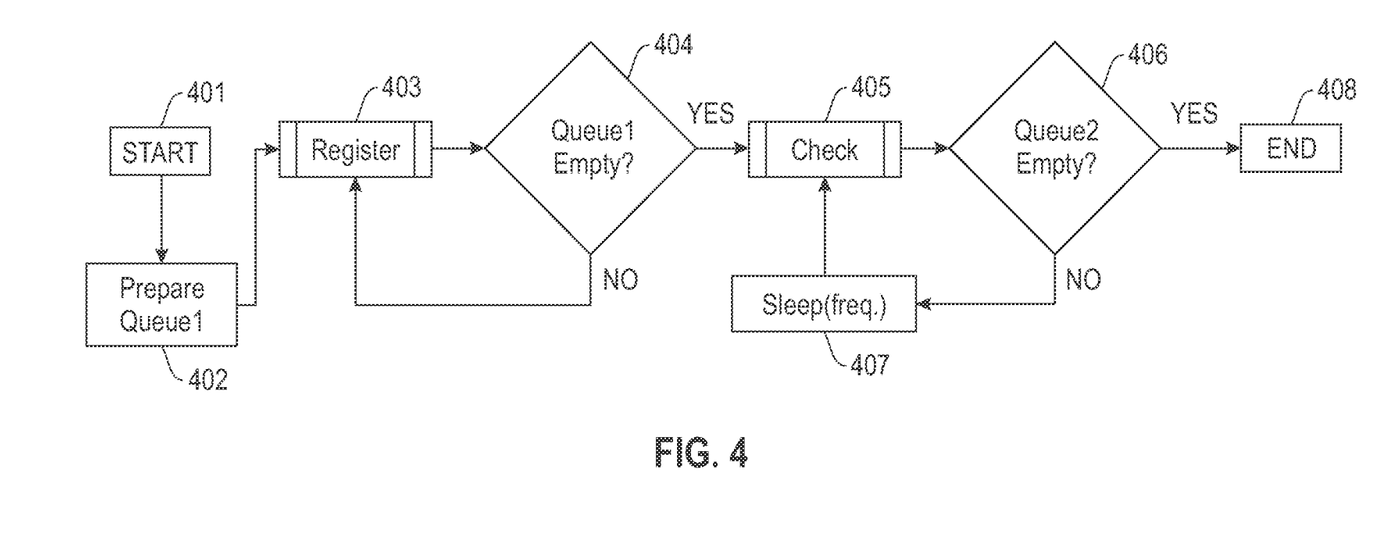
FIG. 4 depicts a protocol for parallel registration according to embodiments of the present disclosure.

Referring to FIG. 4, a protocol for parallel registration according to embodiments of the present disclosure is provided. In some embodiments, the protocol is implemented by adaptive Java UDFs. However, one of skill in the art will appreciate that alternative implementations, for example in other languages, will not depart from the scope of the present disclosure. As depicted in FIG. 4, there are two queues. Queue 1 is for tasks that this instance is trying to register. Queue 2 is for tasks that this instance is waiting for others to register. After the program starts 401, all task names are added to queue 1 402. Then the subprogram register 403 gets executed for each of these tasks. The program flow depicted in FIG. 4 gets executed on each partition of the database in parallel.

Figure 5:
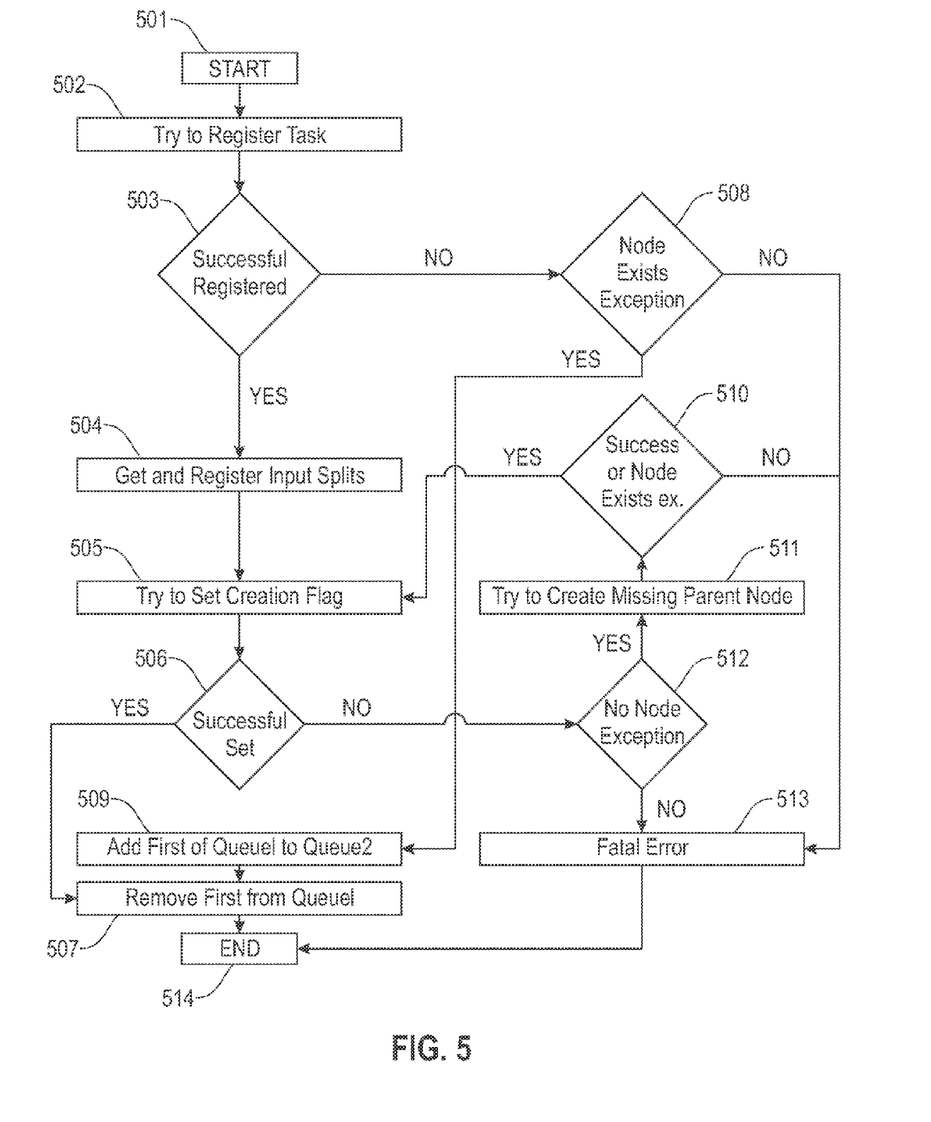
FIG. 5 depicts the protocol for the register phase of parallel registration according to embodiments of the present disclosure.

Referring now to FIG. 5, a register subprogram according to embodiments of the present disclosure is depicted. This subprogram will try to register the first task 502, which in some embodiments includes creating the required folder in a DMDS such as ZooKeeper. It is determined whether registration was successful 503. If the data node or folder is already there, it may be inferred that one of the other partitions was faster. In embodiments using ZooKeeper, a KeeperException$_{java}$ called NodeExistsException$_{java}$ will be thrown 508, however, another indication may be provided by alternative implementations. In this case the current first task from queue 1 gets added to queue 2 509 and removed from queue 1 507 before the subprogram ends 514. This procedure will repeat 404 for each task in queue 1. Queue 2 will contain all tasks which are not created by the specific instance of the UDF and whose creation status needs to be checked in check phase 405.

If the registration was successful 503 the UDF will create and register the input splits 504 to the DMDS. In some embodiments, the Java Class Loader is used to create an instance of the real InputFormat$_{java}$ and call its getSplits method. In some embodiments, the register step 403 is completely implemented in the UDF. This means that in Java-based implementations, the InputFormat$_{java}$ is invoked in the UDF before the Jaql script starts running Afterwards the UDF tries to set the creation flag 505 that shows the other database partitions that all splits of this task are registered completely.

Where the creation flag is not successfully set, a parent data node (e.g., a parent folder in ZooKeeper) may not exist 512. In Java-based embodiments, a KeeperException$_{java}$ called NoNodeExistsException$_{java}$ may be thrown 512. This means that the folder that contains all the creation flags was not created yet. In this case the program will try to create it 511 and retry to set the creation flag afterwards. During recreation, errors resulting from the existence of the target node are ignored. Such errors may arise because of race conditions between the UDF instances on different database partitions and may indicate that another instance was faster with the creation of the parent folder for the creation flags. After the flag is set the task gets removed from queue 1 507 but not added to queue 2, because the current UDF instance must not wait for other instances to register the task. As soon as queue 1 is empty 404 the UDF will switch to the check phase 405.

Figure 6:
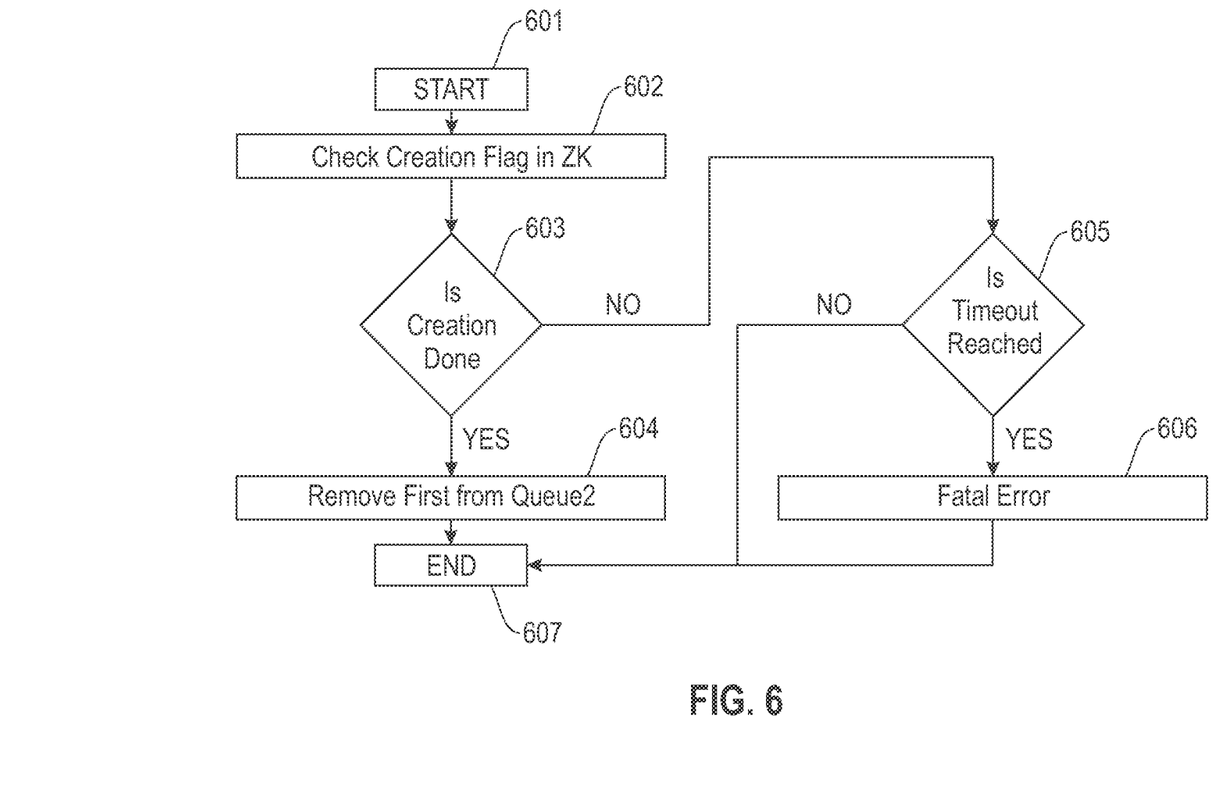
FIG. 6 depicts the protocol for the check phase of parallel registration according to embodiments of the present disclosure.

Referring now to FIG. 6, a protocol for the check phase of parallel registration according to embodiments of the present disclosure is depicted. In this phase the program will wait until all tasks that were not created by its self are completely created by other partitions. The UDF checks the creation status 602 at a rate determined by the frequency parameter at initialization. If a task is marked as created 603, the task is removed from queue 2 604. The subprogram ends normally 607 if queue 2 is empty and with an exception 606 if the timeout parameter is reached first 605. In some embodiments, an exception anywhere in the UDF that is not otherwise described herein will cause the function to terminate abnormally.

Figure 7:
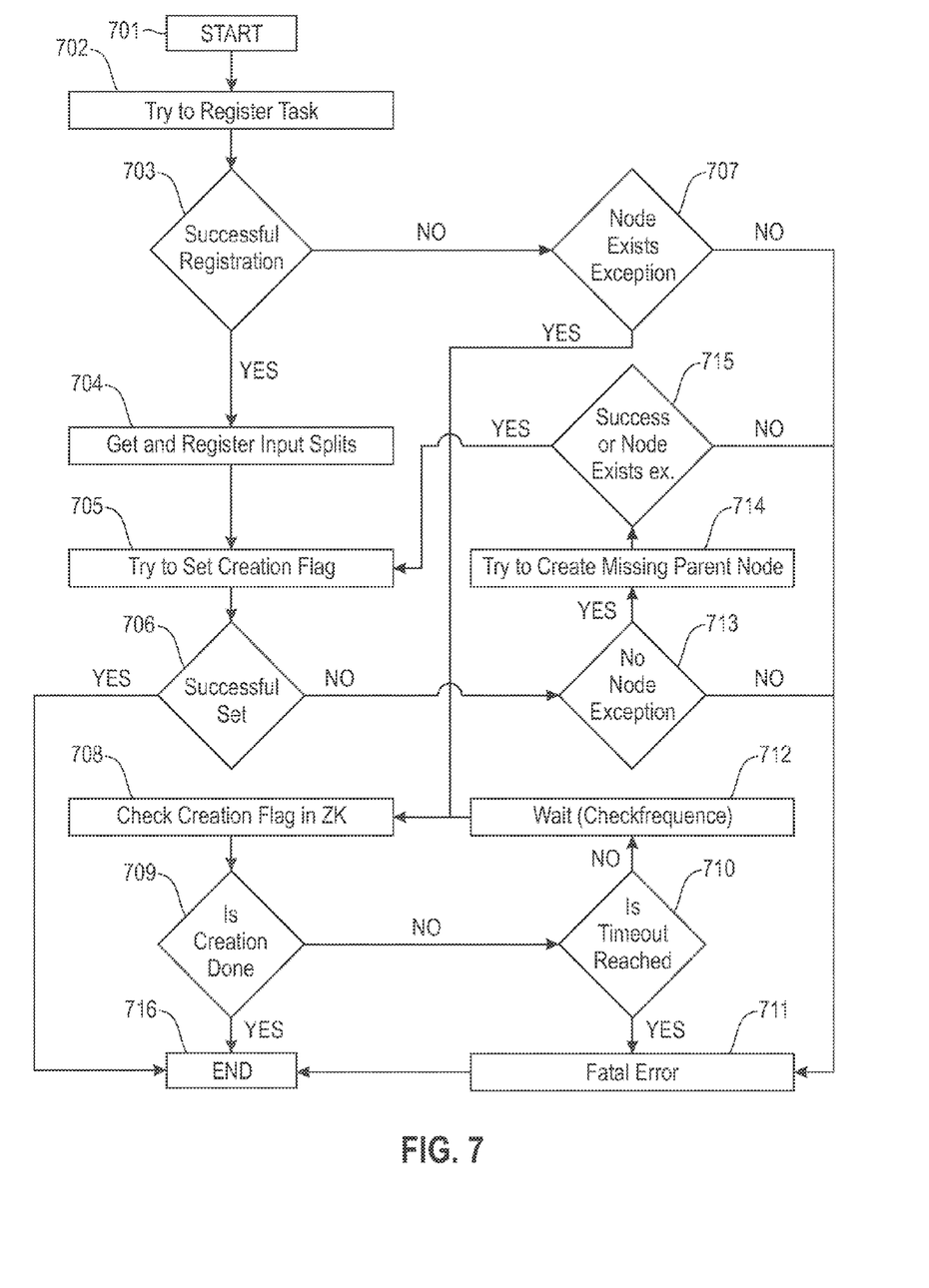
FIG. 7 depicts an optimized single-read protocol according to embodiments of the present disclosure.

Referring now to FIG. 7, an optimized single-read protocol according to embodiments of the present disclosure is depicted. The single-read protocol assumes that there is only one task to be created. This allows an optimization in the protocol. The two queues are no longer required, because the program can directly switch from the creation to the check phase if a data node already exists while trying to register the task (indicated by, e.g., a NodeExistsException$_{java}$). In this case the task creation needs to be checked in the check phase. Otherwise the UDF instance creates the task on its own and can just skip the check phase.

Whenever Jaql reads any data, whether from HDFS, a database or from local file system, the Jaql read function is used. Since Jaql is based on JSON data type the function takes a JSON record as parameter. This record contains the classes that should be used for the read and the location(s) of the input. In some embodiments, this structure is extended to enable adaptive file assignment. The format (InputFormat$_{java}$) and the configurator (InitializableConfSetter$_{java}$) in the inoptions subrecord is replaced with wrapper classes.

In some embodiments, the replacement format extends FileInputFormat$_{java}$ as an implementation of the InputFormat$_{java}$ interface. It provides a getSplits and a getRecordReader method. Normally the getSplits method returns an array of InputSplits but in embodiments according to the present disclosure, only one fake split is returned. During execution, Jaql will call getRecordReader with this fake split as a parameter. The method will return a record that manages the communication with the DMDS and assigns the real splits.

In some embodiments using Hadoop, a wrapper class instead of the real input configurator (instance of InitializableConfSetter$_{java}$) is placed in the inoptions subrecord. This ZooKeeperInputConfigurator$_{java}$ creates the JobConf$_{java}$ objects required by Hadoop and sets the values for the additional parameters. Then it takes the given "realInputConfigurator" parameter value and creates an instance of this class using Javas Class Loader. The resulting instance is used to set all non-additional configurations to the JobConf$_{java}$ object in order to add additional parameters to the input of Jaqls read function.

In some embodiments, a similar architecture to store configurations is used for the adaptive parallel UDFs as for existing input formats. This maintains compatibility with the alternative implementations of Adaptive MR, and Jaql.

In some embodiments, at the top level of the JSON input record four new key value pairs are required. "realConfigurator" takes the InitializableConfSetter$_{java}$ and "realInputFormat" takes the InputFormat$_{java}$ where replaced with wrapper classes. "taskName" contains a unique name for the task defined by the user. "numberOfSplits" specifies how many splits are created and registered to ZooKeeper.

In an exemplary case, a user can get a word count for each word included in multiple input files. An adaptive file assignment is provided, optimized for multiple tasks. As the first step the user specifies a unique task name for each read task (e.g., task1, task2 and task3). According to this the input files are called inputFile1, inputFile2 and inputFile3 assuming that these placeholders contain absolute paths of the input files.

Because the user should not be asked to type the JSON input for the Jaql read function twice, this value is referred in the Jaql script with markers which get replaced by the UDF, as shown in Inset 2.

---
Inset 2
--- read ( $task1 ) -> transform strSplit ( $ , " " ) -> expand ;
read ( $task2 ) -> transform strSplit ( $ , " " ) -> expand ;
read ( $task3 ) -> transform strSplit ( $ , " " ) -> expand ;

---

Assuming that all input files are standard text files, the SQL query for the word count looks like shown in Inset 3. Although this is a relatively simple example, the systems and method of the present disclosure provide the ability to handle combined data sources with various types in a single query.

---
Inset 3
---

SELECT word , COUNT( * ) AS count
  FROM
    TABLE(ZK TABLE EE( 'test.jaql' , '{
  "location": "inputFile1",
    "taskName": "task1",
    "numberOfSplits":10,
    "realInputFormat": "com.ibm.biginsights.compress.mapred.
       CompressedTextInputFormat",
    "realConfigurator": "com.ibm.jaql.io.hadoop.
       FileInputConfigurator",
    "inoptions": {
       "adapter": "com.ibm.jaql.io.hadoop.
          DefaultHadoopInputAdapter",
       "format": "com.ibm.zookeeper.jaqlsqlmr.
          LinesTestInputFormat", ---
Inset 3
---

"configurator": "com.ibm.zookeeper.jaqlsqlmr.
          TestInputConfigurator",
       "converter": "com.ibm.jaql.io.hadoop.
          FromLinesConverter"
    }|{
  "location": "inputFile2",
    "taskName": "task2",
    "numberOfSplits":10,
    "realInputFormat": "com.ibm.biginsights.compress.mapred.
       CompressedTextInputFormat",
    "realConfigurator": "com.ibm.jaql.io.hadoop.
       FileInputConfigurator",
    "inoptions": {
       "adapter": "com.ibm.jaql.io.hadoop.
          DefaultHadoopInputAdapter",
       "format": "com.ibm.zookeeper.jaqlsqlmr.
          LinesTestInputFormat",
       "configurator": "com.ibm.zookeeper.jaqlsqlmr.
          TestInputConfigurator",
       "converter": "com.ibm.jaql.io.hadoop.
          FromLinesConverter"
    }[...]
  }' ,1000 ,120000 ,0) ) AS A (word VARCHAR(30 ) )
GROUP BY word ;

---

The final result table in the database contains all word with their count, as shown in Inset 4.

---
Inset 4
---

[ ... ]
"sollicitudin" 24
"taciti" 3
"ultrices." 6
"varius" 27
"velit" 12
"venenatis." 3
"vitae." 3
"vulputate" 24
    291 record ( s ) selected.

---

Figure 8:
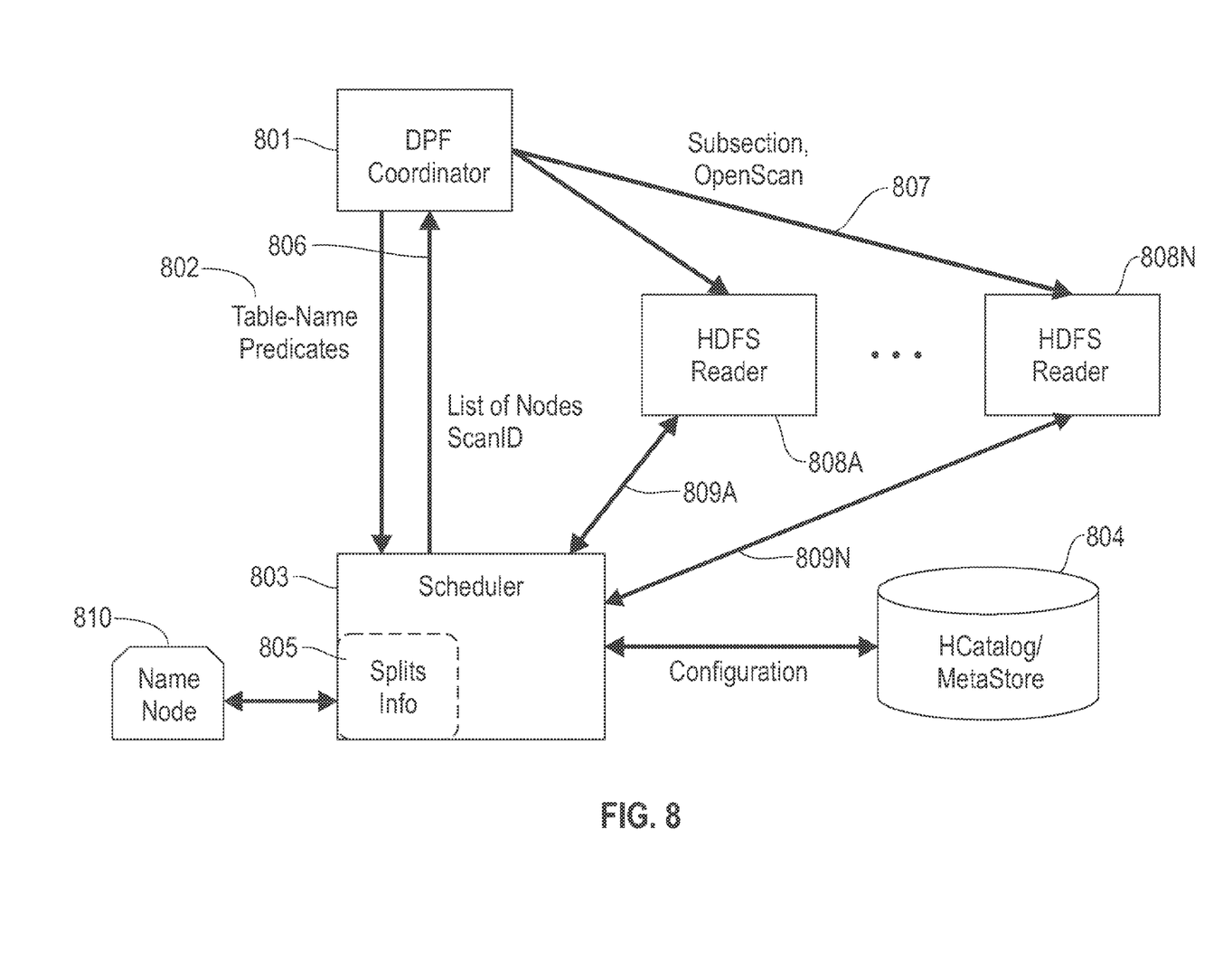
FIG. 8 depicts a scheduler according to embodiments of the present disclosure.

Referring now to FIG. 8, a scheduler according to embodiments of the present disclosure is depicted. FIG. 8 shows a central and separate scheduler for assignment of HDFS blocks to readers. Coordinator 801 passes the name of the table to be read 802, and the split elimination predicates to scheduler 803 (prepareForScan). Scheduler 803 consults a Hadoop catalogue (for example, HCatalog) 804 for inputFormat and split information; first it checks an optional cache for table metadata, then goes to meta-store, if needed. In some embodiments, HCatalog is a DMDS as described above. Scheduler 803 runs partition elimination, runs getSplits, applies split elimination (if needed), and inserts the list of splits 805 in its in-memory work assignment data structure. Scheduler 803 generates a unique id for the scan, and returns 806 the scanID and the list of HDFS nodes that contain table data to the database coordinator 801, which sends 807 subsections to those nodes 808A . . . N. Nodes 808A . . . N, which in some embodiments may include Impala-based readers, make requests 809 for work from the scheduler 803. Readers can also use Jaql scripts without map reduce functions, or the I/O layer of any Hadoop system such as Hive or Impala, or any special program that reads data from HDFS. The scheduler 803 returns split assignments (n at a time). At the first call, the scheduler also returns the table metadata.

In some embodiments using a central scheduler, scatter partitioning is assumed for Hadoop tables. The scheduler makes a best effort to provide data locality. It can also make remote data block assignments. The scheduler will make sure that each data block is assigned to a single HDFS reader, and that all blocks are assigned. In some embodiments, the scheduler uses a db2 node.cfg file to find the locations of DB2 workers (hence impala readers in such embodiments). In other embodiments, the database sends its cluster state to the scheduler when the scheduler starts, and this information is refreshed as needed during execution. If the coordinator (e.g., a DB2 coordinator) detects a node failure when trying to send a subsection, the database engine (e.g., DB2) ignores it and sends the section to the other nodes in the list sent by the scheduler. The scheduler will make sure to assign all the splits of the table to readers. If a node fails after the readers start reading, the query aborts.

Various scheduling algorithms may be employed by a scheduler in accordance with the present disclosure.

In some embodiments, a static scheduling algorithm is employed. The scheduler distributes the total number splits to the available nodes, as evenly as possible. It tries to maximize local data assignments. It uses a round robin algorithm and an in-memory matrix to make sure all splits are assigned to the DB2 nodes. In one embodiment, the scheduler picks a DB2 node and it first tries to assign a local split, if not possible it assigns a remote split. For remote split assignment, it first looks for splits that are not local to any other DB2 node, if not possible, it then picks a split from the DB2 with the largest list of local splits to be assigned. Once a split is assigned, it picks another DB2 node and repeats the algorithm until all the splits are assigned.

In other embodiments, a dynamic scheduling algorithm is employed. In one such embodiment, DB2 readers on each call request N splits, where N is a tunable parameter (specified in the scheduler configuration file). Once a DB2 reader has read all the assigned splits it requests another N. They keep requesting for more work until all the splits have been assigned. On each call the splits are assigned using the same algorithm of static assignment, but instead of one split per iteration, "N" splits are assigned to the DB2 node making the request.

In a shared storage, HDFS data nodes may co-exist with DB2 nodes. DB2 nodes that are also HDFS data nodes with the data to be scanned may be referred to as hot-nodes. In some embodiments, the selection of compute nodes for each scan depends on the number of splits that compose a table and the number of hot-nodes. If the list of DB2 nodes is a subset of the list of table locations, the scheduler uses all the DB2 nodes for the scan. If the list of HDFS data nodes that contains table's data is a subset of the list of DB2 nodes, the scheduler uses only hot-nodes. If the list of DB2 nodes partly overlaps with the list of HDFS data nodes that contain table's data, all DB2 nodes that have an overlap, i.e., hot-nodes, will be used, as well as some of the other DB2 nodes without any accompanying HDFS data node. In the latter, the number nodes depends on the total number of splits that need to be read.

In shared storage, such as HDFS running on GSS, the HDFS data nodes are located in a different set of physical machines, i.e., hot nodes do not exist. In some such embodiments, there are not any preferred nodes, the scheduling algorithms consider all DB2 nodes as hot-nodes.

In an embodiment of the present disclosure, a database system is provided that uses shared-nothing MPP database technology, and processes SQL queries over HDFS data, whether it is shared-nothing or shared storage. To read HDFS data, the database system uses a scan operator. In HDFS, files are divided into blocks. To support the scan operator, HDFS blocks must be assigned to database workers. The scheduler 803 described above is used to assign HDFS blocks within the database system.

The scheduler 803 comprises a set of scheduling algorithms and a data structure to store the state of each scan. In some embodiments, the data structure is an in-memory data structure, which is a matrix of all HDFS blocks to be read and their location, and all available database nodes. In other embodiments, this data structure can be stored in a DMDS, such as ZooKeeper.

The scheduler needs to decide which database workers will participate in each scan. For this purpose, it needs to know the list of active database workers, as well as HDFS data nodes. For the former, the scheduler retrieves the information from the database server. The scheduler retrieves the list of HDFS data nodes from the HDFS name node 810.

As noted above, in shared nothing local storage architecture, the HDFS data nodes co-exist with the database workers. In the context of scan, database workers that are collocated with HDFS data nodes that contain the table data are called hot-nodes. In the presence of hot-nodes the scheduling algorithms exploit data locality, i.e., they are the preferred ones to read the data. The selection depends on the number of HDFS blocks the table has and the number of hot-nodes.

If the list of database workers is a subset of the list of table locations (list of data nodes that contain table's data), the scheduler uses all the database workers for the scan. If the list of HDFS data nodes that contains table's data is a subset of the list of database workers, the scheduler uses only hot-nodes. If the list of database workers partly overlaps with the list of HDFS data nodes that contain table's data, all database workers that are in the overlap, i.e., hot-nodes, will be used, as well as some of the other database workers, which do not have a collocated HDFS data node. In the latter the number such workers depends on the total number of HDFS blocks that need to be read. In this case the latter set of database workers will be reading remotely.

In shared storage, such as HDFS running on GSS, the HDFS data nodes are located in a different set of physical machines, i.e., hot nodes do not exist. In such a scenario there is no preferred nodes, the scheduling algorithms consider all database workers as hot-nodes, and they all read remote HDFS blocks.

For each scan, a ScanState represents the scheduling decisions taken for a specific scan during its execution. The scheduling decision is done using two scheduling algorithms: static and dynamic.

For static assignment the database workers make a single call to the scheduler, and get back both their block assignments as well as the table metadata. The scheduler distributes the total number blocks to the available database workers, as evenly as possible, while maximizing local data assignments. For this purpose, it uses a round robin algorithm and an in-memory matrix to make sure all blocks are assigned to the database workers. The scheduler picks a database worker and it first tries to assign a local HDFS block. If this is not possible, then it assigns a remote HDFS block. For remote block assignment, it first looks for blocks that are not local to any other database workers. If there are none, it then picks an HDFS block from the database worker with the largest list of local HDFS blocks that need to be assigned. Once a block is assigned, it picks another database worker and repeats the algorithm until all the blocks are assigned.

For dynamic assignment, the database workers on each call request N HDFS blocks, where N is a tunable parameter (specified in the scheduler configuration file). Once a database worker has read all its assigned blocks it requests another set of N HDFS blocks. They keep requesting for more work until all the HDFS blocks have been assigned. The scheduler returns an empty list when there are no blocks to assign. On each call the HDFS blocks are assigned using the same algorithm of static assignment, but instead of one block per iteration, N blocks are assigned to the database worker making the request.

Figure 9:
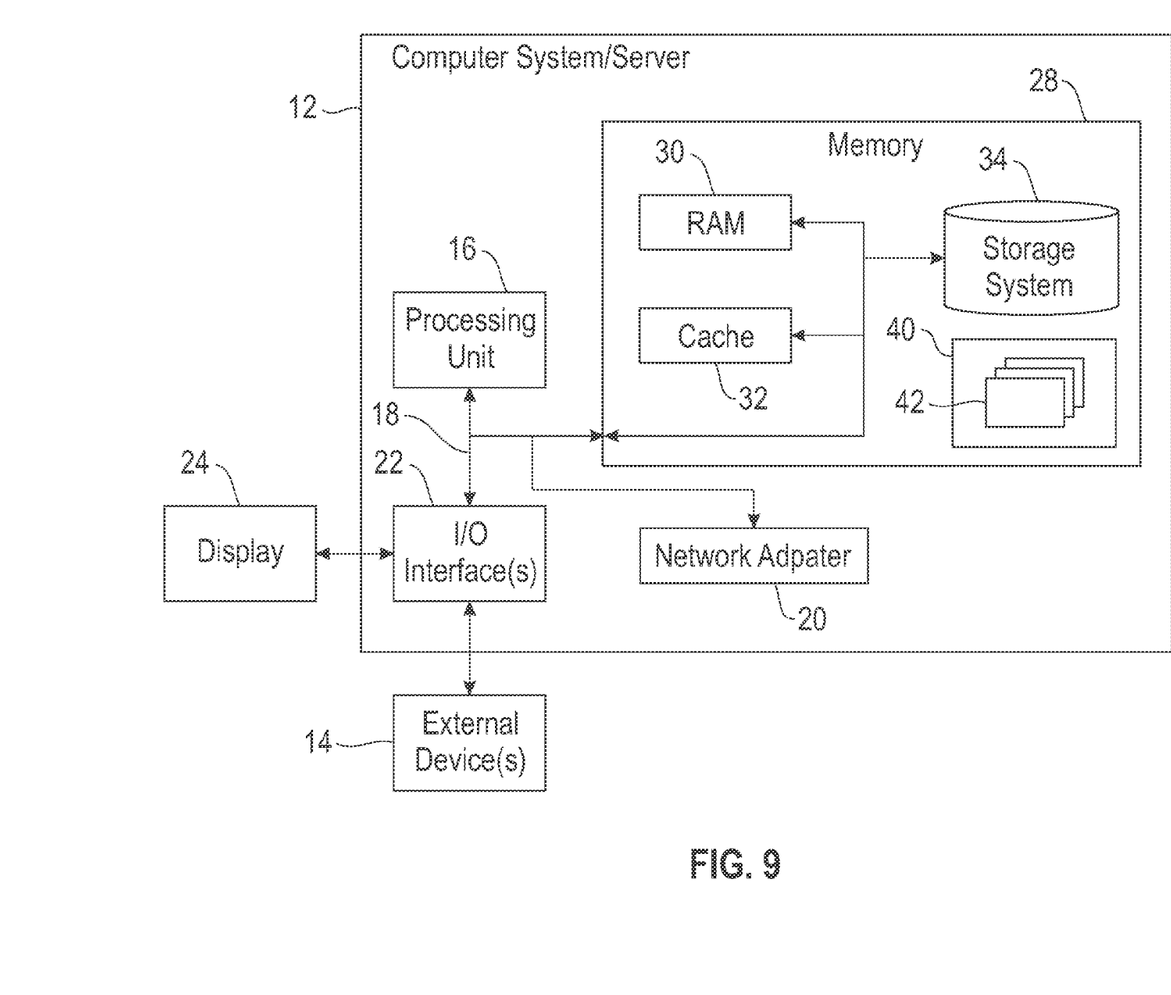
FIG. 9 depicts a computing node according to an embodiment of the present invention.

Referring now to FIG. 9, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a database query for table data;
retrieving metadata for a plurality of blocks in a distributed file system from a distributed metadata store, each of the plurality of blocks containing a subset of the table data;
receiving at a scheduler a plurality of requests for work from a plurality of requestors, each of the plurality of requestors comprising a database worker; and
providing by the scheduler an assignment of one or more of the plurality of blocks to the plurality of requestors, such that each of the plurality of blocks is assigned, and wherein a first of the plurality of requestors having no local blocks of the plurality of blocks is assigned a remote block of the plurality of blocks associated with a second requestor of the plurality of requestors having a largest list of local blocks to be assigned.

2. The method of claim 1, wherein the metadata store is ZooKeeper.

3. The method of claim 1, wherein the file system is HDFS and the blocks are splits.

4. The method of claim 1, wherein the file system comprises a plurality of splits, and each of the plurality of splits comprises a plurality of the blocks of the distributed file system.

5. The method of claim 1, wherein the table data comprises a plurality of files and each of the plurality of files comprises at least one of the plurality of blocks, the method further comprising:

determining from a file system the blocks included in each of the plurality of files.

6. The method of claim 1, wherein the assignment is of a predetermined number of the plurality of blocks.

7. The method of claim 1, wherein the assignment is of only those of the plurality of blocks necessary for the database process to complete a first query.

8. The method of claim 1, wherein the assignment is of blocks local to at least one requestor.

9. A computer program product for assigning data in a distributed file system to database workers, the computer program product comprising a computer readable storage medium having program instructions embodied therewith, the program instructions executable by a processor to cause the processor to perform a method comprising:

receiving a database query for table data;

retrieving metadata for a plurality of blocks in a distributed file system from a distributed metadata store, each of the plurality of blocks containing a subset of the table data;

receiving at a scheduler a plurality of requests for work from a plurality of requestors, each of the plurality of requestors comprising a database worker;

providing by the scheduler an assignment of one or more of the plurality of blocks to the plurality of requestors, such that each of the plurality of blocks is assigned, and wherein a first of the plurality of requestors having no local blocks of the plurality of blocks is assigned a remote block of the plurality of blocks associated with a second requestor of the plurality of requestors having a largest list of local blocks to be assigned.

10. The computer program product of claim 9, wherein the table data comprises a plurality of files and each of the plurality of files comprises at least one of the plurality of blocks, the method further comprising:

determining from a file system the blocks included in each of the plurality of files.

11. The computer program product of claim 9, wherein the assignment is of a predetermined number of the plurality of blocks.

12. The computer program product of claim 9, wherein the assignment is of only those of the plurality of blocks necessary for the database process to complete a first query.

13. The computer program product of claim 9, wherein the assignment is of blocks local to at least one requestor.

14. The computer program product of claim 9, wherein the metadata store is ZooKeeper.

15. The computer program product of claim 9, wherein the file system is HDFS and the blocks are splits.

16. The computer program product of claim 9, wherein the file system comprises a plurality of splits, and each of the plurality of splits comprises a plurality of the blocks of the distributed file system.

* * * * *